US012737259B2

(12) United States Patent
Chen et al.

(10) Patent No.: US 12,737,259 B2
(45) Date of Patent: Sep. 15, 2026

(54) RECOVERING LAYERS OF A CONTAINER

(71) Applicant: International Business Machines Corporation, Armonk, NY (US)

(72) Inventors: Xiao Ling Chen, Beijing (CN); Si Yu Chen, Beijing (CN); Wen Ji Huang, Beijing (CN); Hao Wu, Beijing (CN); Wen Qi WQ Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/817,324

(22) Filed: Aug. 28, 2024

(65) Prior Publication Data

US 2026/0064538 A1 Mar. 5, 2026

(51) Int. Cl.
*G06F 11/14* (2026.01)

(52) U.S. Cl.
CPC .... *G06F 11/1438* (2013.01); *G06F 2201/815* (2013.01)

(58) Field of Classification Search
CPC ........... G06F 11/1438; G06F 2201/815; G06F 11/1433; G06F 11/1469; G06F 11/36–3698
See application file for complete search history.

(56) References Cited

U.S. PATENT DOCUMENTS 10,241,778 B2 3/2019 Emeis et al.
10,754,637 B1 8/2020 Zeng et al.
10,936,293 B2 3/2021 Varadharajan Kannan
11,010,259 B1 * 5/2021 Geng .................. G06F 11/1469
11,656,864 B2 5/2023 Chen et al.
11,966,769 B2 4/2024 Hotinger et al.
2006/0288054 A1 12/2006 Johnson et al.
2010/0223602 A1 * 9/2010 Kreek ...................... G06F 8/65 717/140
2017/0068676 A1 3/2017 Jayachandran et al.
2017/0177877 A1 6/2017 Suarez et al.
2018/0088926 A1 3/2018 Abrams (Continued)

FOREIGN PATENT DOCUMENTS

CN 112860490 A 5/2021
CN 114978896 A 8/2022

(Continued)

OTHER PUBLICATIONS

Chen et al., "Recovering Layers of a Container", U.S. Appl. No. 18/742,064, filed Jun. 13, 2024.

(Continued)

*Primary Examiner* — Michael Maskulinski
(74) *Attorney, Agent, or Firm* — CANTOR COLBURN LLP; Aaron Pontikos

(57) ABSTRACT

Examples described herein provide a computer-implemented method that includes downloading a container image from an image repository. The method further includes deploying the container image as a container at a local graph. The method further includes identifying an image layer of the container image of the container as having a patch in error. The method further includes performing at least one of recovering and rebasing the image layer having the patch in error without redeploying the container image at the local graph or restarting a service running the container.

17 Claims, 11 Drawing Sheets

(56) References Cited

U.S. PATENT DOCUMENTS

| | | | |
|---|---|---|---|
| 2018/0189122 A1 | 7/2018 | Jobi et al. | |
| 2018/0309747 A1 | 10/2018 | Sweet et al. | |
| 2019/0114164 A1* | 4/2019 | Wong | G06F 8/658 |
| 2019/0146772 A1 | 5/2019 | Griffin et al. | |
| 2019/0332780 A1 | 10/2019 | Cui et al. | |
| 2020/0250319 A1 | 8/2020 | Bacher et al. | |
| 2021/0173935 A1 | 6/2021 | Ramasamy et al. | |
| 2022/0012137 A1 | 1/2022 | Xiao et al. | |
| 2022/0058011 A1 | 2/2022 | Scheinkman et al. | |
| 2022/0237087 A1* | 7/2022 | Reza | G06F 11/1438 |
| 2023/0022646 A1 | 1/2023 | Turull et al. | |
| 2023/0040047 A1 | 2/2023 | Gadepalli et al. | |
| 2023/0091915 A1 | 3/2023 | Chen et al. | |
| 2023/0205601 A1 | 6/2023 | Rao | |
| 2023/0229561 A1 | 7/2023 | Iyer et al. | |
| 2023/0229567 A1 | 7/2023 | Pabón et al. | |
| 2023/0325169 A1 | 10/2023 | Chibon et al. | |
| 2024/0080277 A1 | 3/2024 | Lee et al. | |
| 2024/0111511 A1 | 4/2024 | Sui et al. | |
| 2024/0184558 A1 | 6/2024 | Chen et al. | |
| 2025/0199839 A1* | 6/2025 | Chibon | G06F 9/45558 |
| 2025/0265067 A1* | 8/2025 | De Marco | G06F 9/45558 |

FOREIGN PATENT DOCUMENTS

| | | |
|---|---|---|
| EP | 3835987 A1 | 6/2021 |
| EP | 4258106 A1 | 10/2023 |
| WO | 2023212228 A1 | 11/2023 |

OTHER PUBLICATIONS

List of IBM Patents or Patent Applications Treated as Related; Date Filed: Aug. 28, 2024, 2 pages.

List of IBM Patents or Patent Applications Treated as Related; Date Filed: Oct. 17, 2024, 2 pages.

Chen, et al., "Title", U.S. Appl. No. 18/915,519, filed Oct. 15, 2024.

Chen et al., "Recovery of Containers Having Image Layers With Inter-Layer Dependencies" U.S. Appl. No. 19/014,921, filed Jan. 9, 2025.

Chen, et al., "Renewing Layers of a Container Without Restarting," U.S. Appl. No. 18/985,180, filed Dec. 18, 2024.

International Searching Authority, "Notification of Transmittal of the International Search Report and the Written Opinion of the International Searching Authority, or the Declaration", International Application No. PCT/EP2025/079410, Jan. 26, 2026, 12 pages.

International Searching Authority, "Notification of Transmittal of the International Search Report and the Written Opinion of the International Searching Authority, or the Declaration", International Application No. PCT/EP2025/083543, Feb. 11, 2025, 11 pages.

Mccarty, "A Practical Introduction to Container Terminology", Red Hat Developer Blog Articles, Feb. 22, 2018, 31 pages.

SIPSMA "Merge+Diff: Building DAGs More Efficiently and Elegantly" https://www.docker.com/blog/mergeddiff-building-dags-more-efficiently-and-elegantly/, Apr. 28, 2022, 37 pages.

Non-Final Rejection Mailed on Apr. 29, 2026 for U.S. Appl. No. 18/742,064, 10 page(s).

International Searcing Authority, "Notification of Transmittal of the ISR and the WO of the International Searching Authority, or the Declaration", International App No. PCT/EP2025/087154, Feb. 16, 2026, 12 pages.

* cited by examiner

OPELRC module
(Online Patch in Error Layer Recovery)

OPELRB module
(Online Patch in Error Layer Rebase)

RECOVERING LAYERS OF A CONTAINER

BACKGROUND

The present disclosure relates to computing systems, and more specifically, to recovering layers of a container.

Containers provide an application layer approach to virtualization. A container packages together code and its dependencies, and the container can be run on a physical processing system. Multiple containers can be run on the same physical processing system. This approach uses less resources than a virtual machine approach to virtualization.

SUMMARY

According to an embodiment, a computer-implemented method for recovering layers of a container is provided. The method includes downloading a container image from an image repository. The method further includes deploying the container image as a container at a local graph. The method further includes identifying an image layer of the container image of the container as having a patch in error. The method further includes performing at least one of recovering and rebasing the image layer having the patch in error without redeploying the container image at the local graph or restarting a service running the container.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

Figure 1:
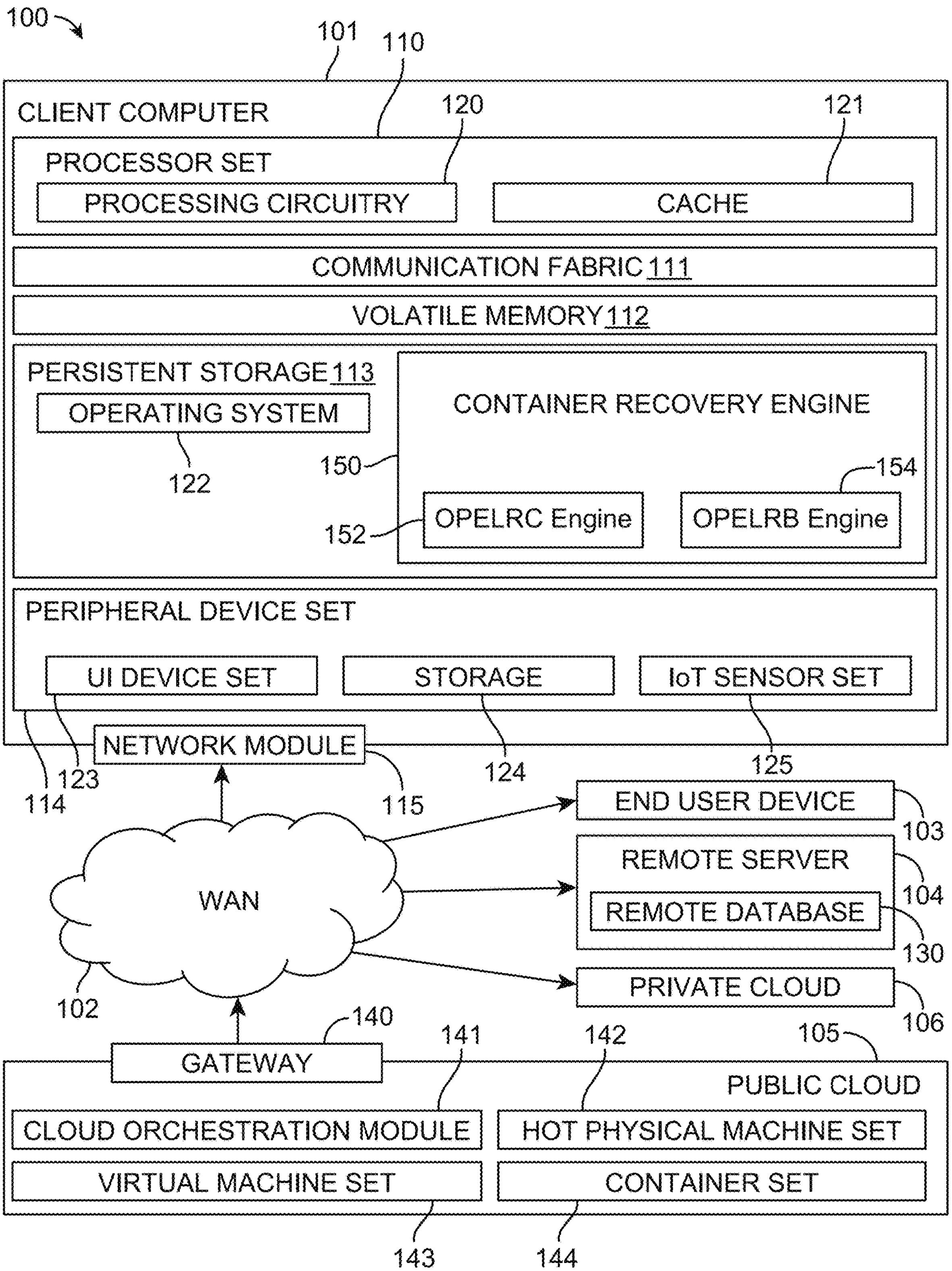
FIG. 1 illustrates a computing environment having an online patch in error layer recovery engine and an online patch in error rebase engine, according to an embodiment.

The detailed description explains embodiments of the disclosure, together with advantages and features, by way of example with reference to the drawings.

DETAILED DESCRIPTION

One or more embodiments described herein relate to recovering layers of a container.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a container recovery engine 150, which may be used for recovering layers of a container. The container recovery engine 150 may include an online patch in error layer recovery (OPELRC) engine 152 and an online patch in error layer rebase (OPELRB) engine 154. In addition to container recovery engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container recovery engine 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in container recovery engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in container recovery engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Containers package together code and its dependencies to provide for virtualization. Some approaches to implementing containers involve packaging the contents of image layers into an image and pushing the image to an image repository. The image can then be pulled from the image repository to be implemented on other systems, such as by end users. When pulling an image from the image repository, the contents of the image layers and any parent layers for the image are downloaded to a local graph. The local graph (also referred to as a "local graph node") is a structure used for managing and visualizing dependencies, relationships, and/or states of Docker containers and services within a local environment (e.g., a user's production environment). The local graph is managed by the Docker daemon (e.g., Dockerd), and the Docker command line interface (CLI) can be used to interact with the local graph. For example, the Docker CLI can be used to list images, create containers, remove containers and images, inspect images and containers, and more. Once downloaded, the image can be stored on a local graph and deployed as a container. In other words, the layers of the image are uploaded to the image repository and then those layers are later downloaded to one or more local graphs for deployment as a container.

In some cases, patches may be released to fix bugs or add functionality to an image. For example, after an image is released (e.g., uploaded to the image repository), an error may be identified in the image, and a patch may be released to address the error. In such cases, a patch itself may have an error, which is referred to as a "patch in error." It is often not possible for a user to remove the patch in error immediately if a higher version is used in the user's production environment. If a higher version (e.g., layer 8 (L8)) was exploited on a user's production environment, it is not possible for the user to remove the layer 5 (L5) with the patch in error from the exploited customers. For example, to fix an issue identified in an older layer (e.g., layer 3 (L3)) of an image, a fix patch can be delivered on a newer layer (e.g., layer 5 (L5)) of the image. It may be discovered thereafter that the fixes on the newer layer (e.g., L5) trigger other errors, thus the original patch was a patch in error.

A situation may occur where a higher version of the image is used (e.g., a top layer of a user's environment is layer 8 (L8) in which L5 includes the patch in error followed by layers 6 and 7 (L6 and L7). In such cases, there are two options for the user: wait for the availability of L5 fixes (which may take several months to receive, for example) or to redeploy a lower safe version (e.g., the version for layer 4 (L4) or lower) and abandon the newer functions or fixes on the higher layers (e.g., L6 and L7). Neither of these approaches is desirable due to the delay and loss of fixes and functionality (which may impact security vulnerability exposure, for example), respectively.

One approach to address these and other shortcomings is to recover layers of a container by updating a manifest list of an image repository with real-time patch in error information, including a "manPatchHealthStatus" indicator and a "manLowerLayerID" indicator. A single manifest includes information about an image, such as its size, layers, and digest. A manifest list is a list of image layers (e.g., "manifests" or "manifest items") that are created by specifying one or more image names. Then, the layers without the patches in error are pulled to help user promote the robustness of the enterprise-level production environments as soon as possible and avoid security vulnerability exposure as much as possible.

Although this approach is suitable for its intended purpose, it is desirable to provide for recovering layers of a container online (e.g., while the container is deployed). One or more embodiments described herein provides for recovering a container layer that uses the image including the layer having a patch in error, which is pulled to the local graph or to support recovering the layer with the patch in error online if the layer is deployed in a contained with patch in errors locally, as is further described herein.

Current container technology packages the contents of image layers and pushes them to a repository in the form of an image. When pulling an image from the repository, the entire contents of the specified image layers and parent layers are downloaded to the local environment. This process requires uploading or downloading layers of the image, which can be inefficient and time-consuming.

After the release of a product, continuous delivery of patches is necessary for service work. If a patch released months earlier is found to be in error, users cannot immediately remove the erroneous patch if a higher version is used in their product environment. For instance, if an issue is found on an old layer and a fix patch is delivered on a newer layer, and later the fix patch triggers other errors, users face significant challenges. In such cases, users either wait for the availability of fixes for the erroneous patch or redeploy a lower safe version, abandoning new functions or fixes on higher layers.

According to one or more embodiments described herein, a method is provided that provides for improved use of product capabilities, automation, and resiliency insights by recovering or rebasing the layer with a patch in error on a local graph or exploited containers. Such an approach creates a new storage level "diff-relocation" with two attributes "diff-removal" for the masked layer with patch in error and "diff-rebase" for the original storage of the layer with patch in error. Then the layer with patch in error can be recovered or rebased by relocating layer cacheID's "diff" to "diff-removal" or "diff-rebase" folder to help users promote the robustness of the enterprise-level production environments as soon as possible and avoid or reduce the security vulnerability exposure. As used herein, "diff" refers to a folder that stores a "diffID" and is used to check layer items on a root file system via a command "docker inspect image layer checksum ID," which is obtained by calculating a tar data checksum of the image layer "diff" folder. The "diff" stores information about the content of a layer, such as updated file, new file, removed file, directory file, and/or the like, including combinations and/or multiples thereof. The "diffID" is a unique identifier that identifies the layers of the image.

This approach provides for users to recover or rebase the layer with patch in error on local pulled image or exploited containers without waiting for the fixes available or redeploying exploited containers on customer's docker environment especially the product environment. With such an approach, there is no need to restart the docker service or running containers. Moreover, the approach is transparent to both the developers of the image and the end users.

Figure 2B:
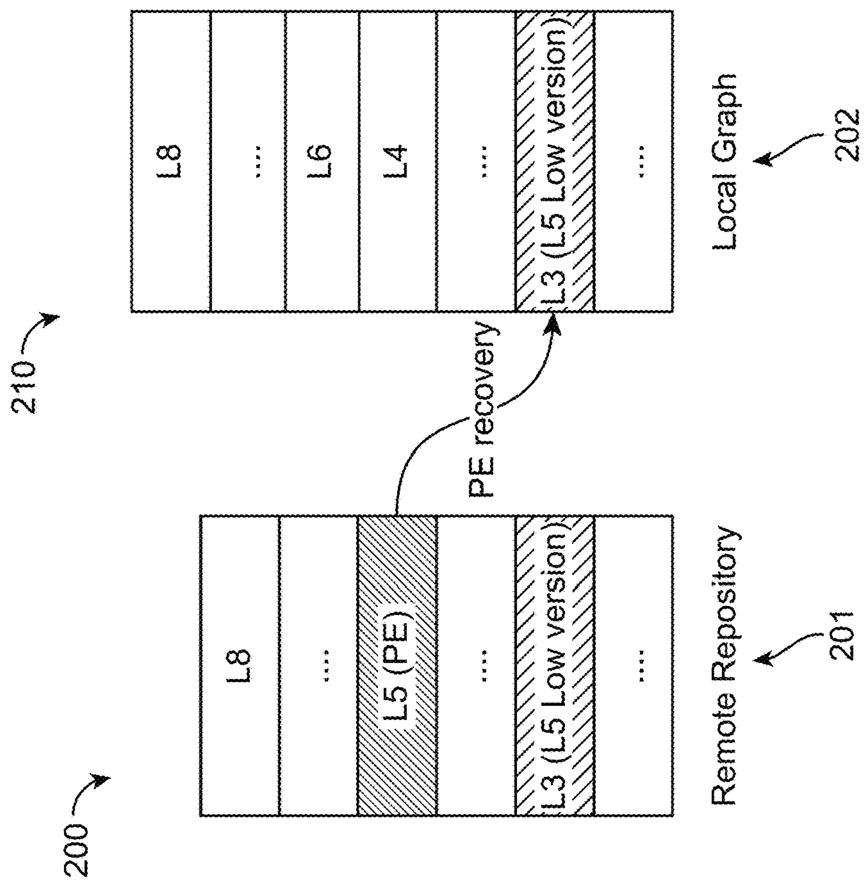
FIGS. 2A and 2B illustrate an image and a container, each with layers, according to an embodiment.
Figure 2A:
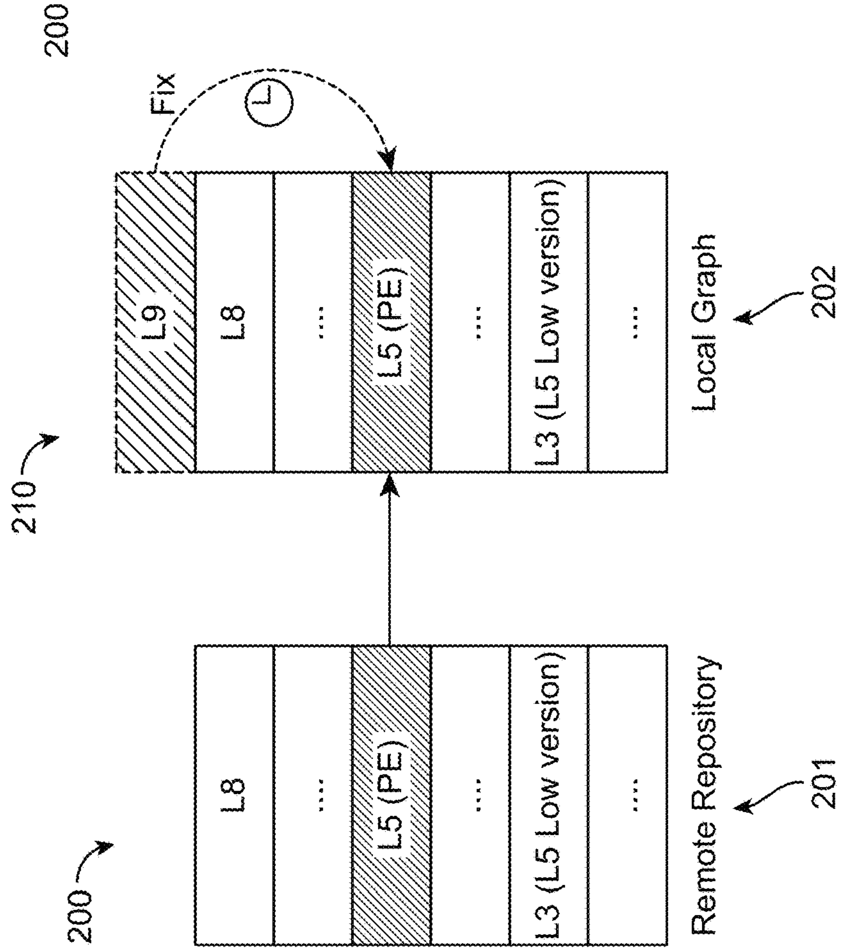

Turning now to FIGS. 2A and 2B, a container image 200 and a container 210, each with layers, are shown, according to an embodiment. The container image 200 is stored in an image repository 201 and can be downloaded to and installed on a local graph 202 as the container 210. A container image (e.g., the container image 200) is a standalone executable software package that includes the information needed to run a piece of software, including the code, runtime, system tools, libraries, and settings. Container images are used to create containers, which are instances of the container images running as isolated processing on a host operating system (e.g., the operating system 122). For example, the container image 200 is used to create the container 210. According to an embodiment, the container 210 in FIGS. 2A and 2B is a container image pulled from the image repository 201 to the local graph 202. According to another embodiment, consider the following example. Docker mounts layers (e.g., a base layer, layer L1, . . . Layer L7, Layer L8) at one mount point. These are called image layers, and the container 210 exploited with this image can share the image layers (e.g., read-only layers) and have their own container layer (read-write layer). For example, Docker runs three containers C1, C2, C3 with image I1, then the containers C1, C2, C3 share the image layers of I1, which is stored in local graph 202 as the container 210 shown.

In FIG. 2A, the container image 200 and the container 210 are shown as having multiple layers, including layers L3, L5, and L8, among others. In FIG. 2B, the container image 200 and the container 210 are also shown as having multiple layers, including layers L3, L4, L5, L6, and L8, among others.

If a patch in error (PE) is deployed to one of the layers (e.g., to the layer L5 as shown in FIG. 2A), it may take time for a new fix to be implemented as a new layer of the container 210 of FIG. 2A (e.g., layer L9). In some cases, the new layer (e.g., layer L9) may take weeks or even months to be implemented, thus causing the container 210 to function improperly (e.g., using the patch in error at layer L5) until the fix is implemented. As shown in FIG. 2B, rather than waiting for a new layer (e.g., the layer L9) to be implemented to fix the issue(s) identified in an older layer (e.g., layer L5), it is possible to perform patch in error recovery to recover the layers of the container 210 with patch in error (e.g., the layer L5) quickly based on real-time patch health status "manPatchHealthStatus" and "manLowerLayerID" updated into the manifest as further described herein with reference FIG. 3, for example. The updated "manPatchHealthStatus" and "manLowerLayerID" attributes provide for rolling back the layer of the container having the patch in error (e.g., layer L5) to a parent image layer (e.g., layer L4).

Current container technology packages the contents of image layers and pushes them to a repository in the form of an image. When pulling an image from the repository, the entire contents of the specified image layers and parent layers are downloaded to the local environment. This process requires uploading or downloading layers of the image, which can be inefficient and time-consuming.

After the release of a product, continuous delivery of patches is necessary for service work. If a patch released months earlier is found to be in error, users cannot immediately remove the erroneous patch if a higher version is used in their product environment. For instance, if an issue is found on an old layer and a fix patch is delivered on a newer layer, and later the fix patch triggers other errors, users face significant challenges. In such cases, users either wait for the availability of fixes for the erroneous patch or redeploy a lower safe version, abandoning new functions or fixes on higher layers.

Existing solutions require users to redeploy the container in their environment to recover layers with patches in error. This approach cannot handle scenarios where the container layer using the image with the patch in error is pulled to the local environment. Additionally, the approach does not support recovering layers with patches in error online if there are deployed containers with the erroneous layers locally.

One or more embodiments described herein provide an intelligent and automatic approach to ensure better use of product capabilities, automation, and resiliency insights by recovering or rebasing the layer with a patch in error on local images or exploited containers. For example, a new storage level "diff-relocation" is introduced and has two new attributes: "diff-removal" for the masked layer with a patch in error and "diff-rebase" for the original storage of the layer with a patch in error. The diff-removal attribute is used to mask a layer having a patch in error without waiting for a new fix version of the layer by making diff relocated to the diff-removal folder. The diff-rebase attribute is used to rebase the layer having the patch in error without repulling the layer with the patch in error from a registry or redeploying the container with the layer patch in error by making the diff relocated to the diff-rebase folder One or more embodiments provide for recovering or rebasing the layer with a patch in error by relocating the layer cacheID's diff to the "diff-removal" or "diff-rebase" folder. This approach allows users to recover or rebase the layer with a patch in error on local pulled images or exploited containers without waiting for fixes or redeploying containers in the customer's environment. Such an approach is transparent to both developers and end users, and does not require restarting the docker service or running containers.

Figure 3:
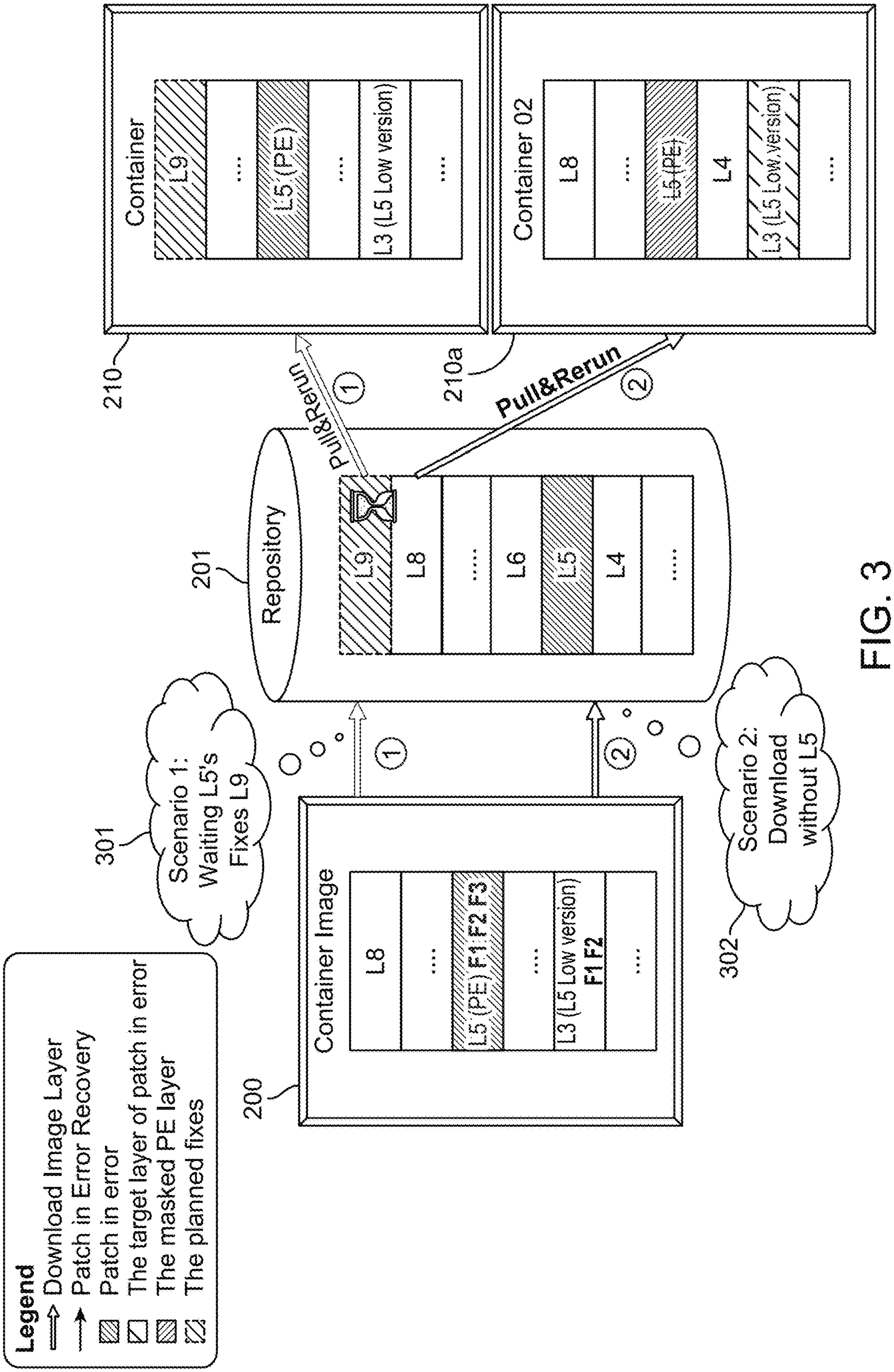
FIG. 3 illustrates scenarios for handling a patch in error in container layers, including waiting for fixes and downloading without the patch in error, according to an embodiment.

FIG. 3 illustrates scenarios 301, 302 for handling a patch in error in container layers, including waiting for fixes and downloading without the patch in error, according to an embodiment. FIG. 3 shows the flow of a container image 200 and the different approaches to managing a layer having a patch in error.

A container image 200 includes multiple layers such as L3, L5 (with a patch in error), and L8. The container image 200 is stored in a repository 201, which manages the storage and distribution of container images. Several scenarios for handling a patch in error in container layers are now described.

In scenario 301, the system waits for the fixes for the patch in error in layer L5. The planned fixes are represented by layer L9. The container image 200 is pulled from the repository 201, and the system waits for the availability of L5''s fixes in L9. Once the fixes are available, the updated container image, including L9, is pulled and rerun as container 210. This container 210 includes the layers L9, L5 (with the patch in error), and L3 (L5 low version).

In scenario 302, the system downloads container image without the patch in error in layer L5. The container image 200 is pulled from the repository 201, excluding the layer L5 with the patch in error. The container image is then pulled and rerun as container 210*a*. This container 210*a* includes the layers L8, L6, L4, and L3 (L5 low version), effectively bypassing the layer (L5) with the patch in error by excluding it.

Figure 4:
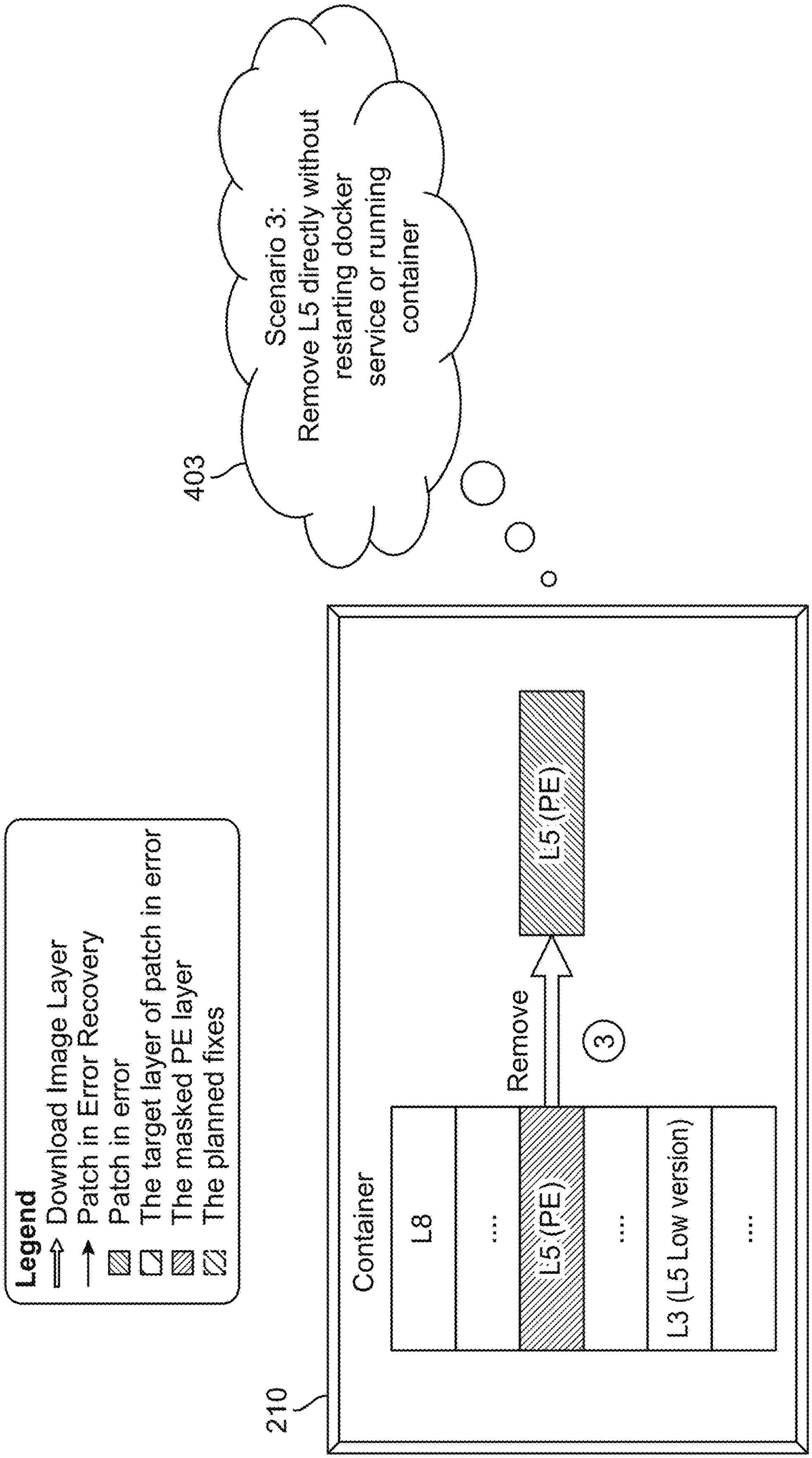
FIG. 4 illustrates a scenario for removing a patch in error layer (L5) from a container without restarting the docker service or running container, according to an embodiment.

Another scenario is now described with reference to FIG. 4. In particular, FIG. 4 illustrates a scenario 403 for removing a patch in error layer (L5) from a container without restarting the docker service or running container, according to an embodiment. The scenario 403 demonstrates how the system can handle patches in error efficiently and seamlessly, ensuring minimal disruption to the running container.

The container 210 includes multiple layers, such as L3 (L5 low version), L5 (with a patch in error), and L8. The patch in error is identified in layer L5, which needs to be addressed to ensure the container 210 operates correctly. To do this, the system removes the patch in error layer (L5) directly without restarting the Docker service or the running container 210. The removal process is represented by the arrow labeled "Remove", which indicates the action of removing the patch in error layer (L5) from the container 210.

By removing the patch in error layer (L5) directly, the system ensures that the container 210 continues to run smoothly without the need for service interruptions or redeployment. This approach minimizes downtime and maintains the integrity and reliability of the containerized application.

Figure 5:
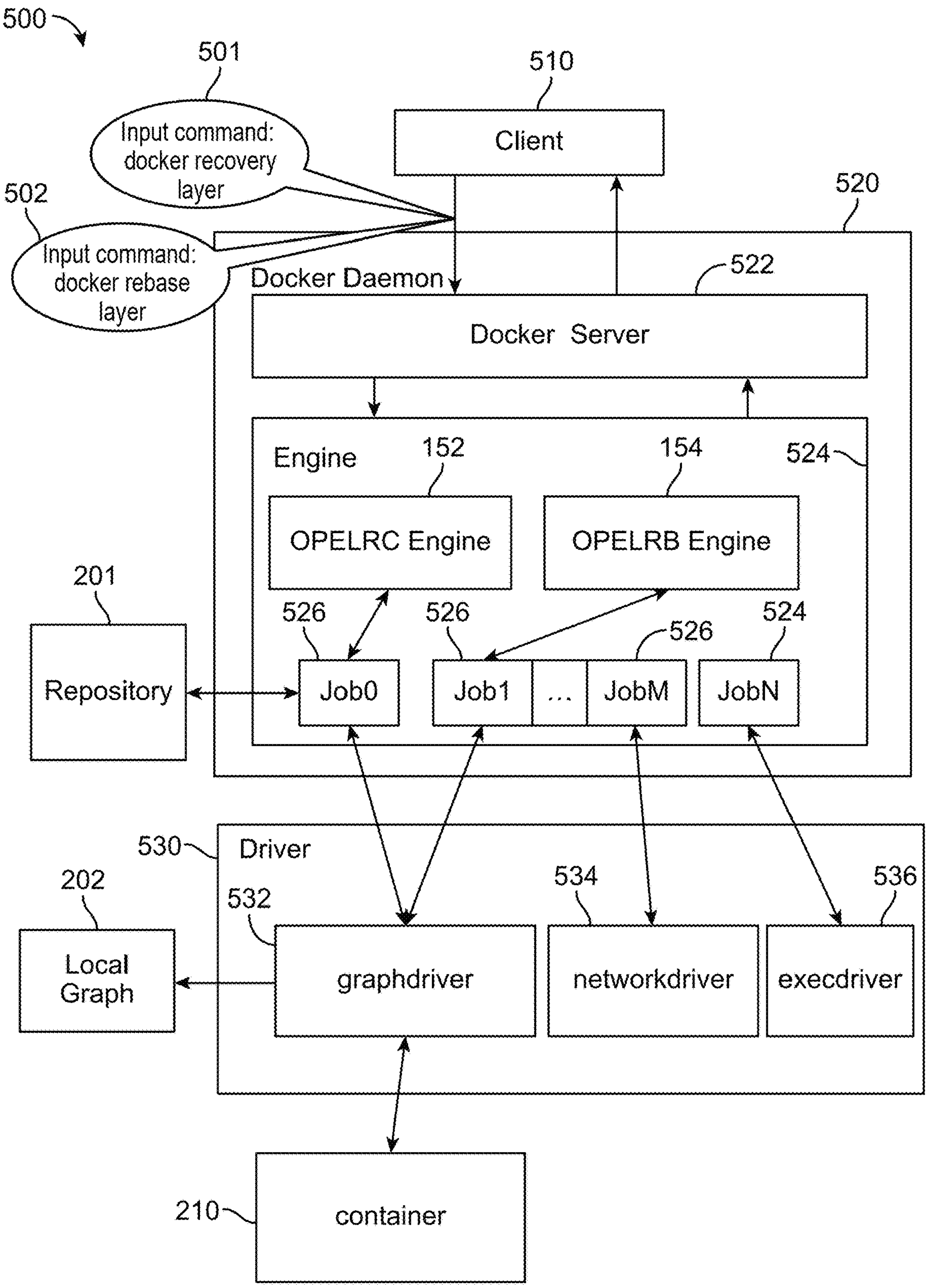
FIG. 5 illustrates a system diagram of a Docker daemon architecture with the online patch in error layer recovery engine and the online patch in error rebase engine of FIG. 1, according to an embodiment.

FIG. 5 illustrates a system diagram of a system 500 having a Docker daemon architecture with the online patch in error layer recovery engine and the online patch in error rebase engine of FIG. 1, according to an embodiment. The system 500 includes a client 510, Docker daemon 520, a Docker server 522, the container 210, and various modules and drivers configured and arranged as shown.

In this example, a client 510 issues a "docker recovery layer" command 501 or a "docker rebase layer" command 502 to a Docker server 522 of a docker daemon 520.

The Docker daemon 520 includes a Docker server 522 and the container recovery engine 150. The container recovery engine 150 522 includes the OPELRC engine 152 (Online Patch in Error Layer Recovery) and the OPELRB engine 154 (Online Patch in Error Layer Rebase). These engine are responsible for handling the recovery and rebase, respectively, of image layers with patches in error.

When the "docker recovery layer" command 501 is received, the OPELRC engine 152 is invoked. The OPELRC engine 152 identifies the image layer with the patch in error and relocates the layer cacheID's diff to a "diff-removal" folder, effectively masking the erroneous layer without redeploying the container image or restarting the service running the container.

Similarly, when the "docker rebase layer" command is received, the OPELRB engine 154 is invoked. The OPELRB engine 154 identifies the image layer with the patch in error and relocates the layer cacheID's diff to a "diff-rebase" folder, restoring the original storage of the layer with the patch in error without redeploying the container image or restarting the service running the container.

The OPELRC engine 152 and the OPELRB engine 154 interact with various jobs 524 (e.g., Job0, Job1, . . . , JomM, JobN), which manage the execution of tasks related to the recovery and rebase processes. These jobs communicate with the driver 530, which includes a graphdriver 532, a networkdriver 534, and an execdriver 536. The graphdriver 532 is responsible for managing the local graph 202, where the container image is deployed as the container 210. The networkdriver 534 and execdriver 536 handle network and execution-related tasks, respectively.

The system 500 also includes the repository 201, from which the container image is downloaded, and a local graph 202, where the container image is deployed and managed as the container 210. That is, the container 210 represents the deployed container running in the local environment.

Overall, FIG. 5 illustrates the detailed architecture and flow of the system 500 for implementing the techniques described herein, providing an efficient and seamless approach to recovering and rebasing image layers with patches in error.

Figure 6:
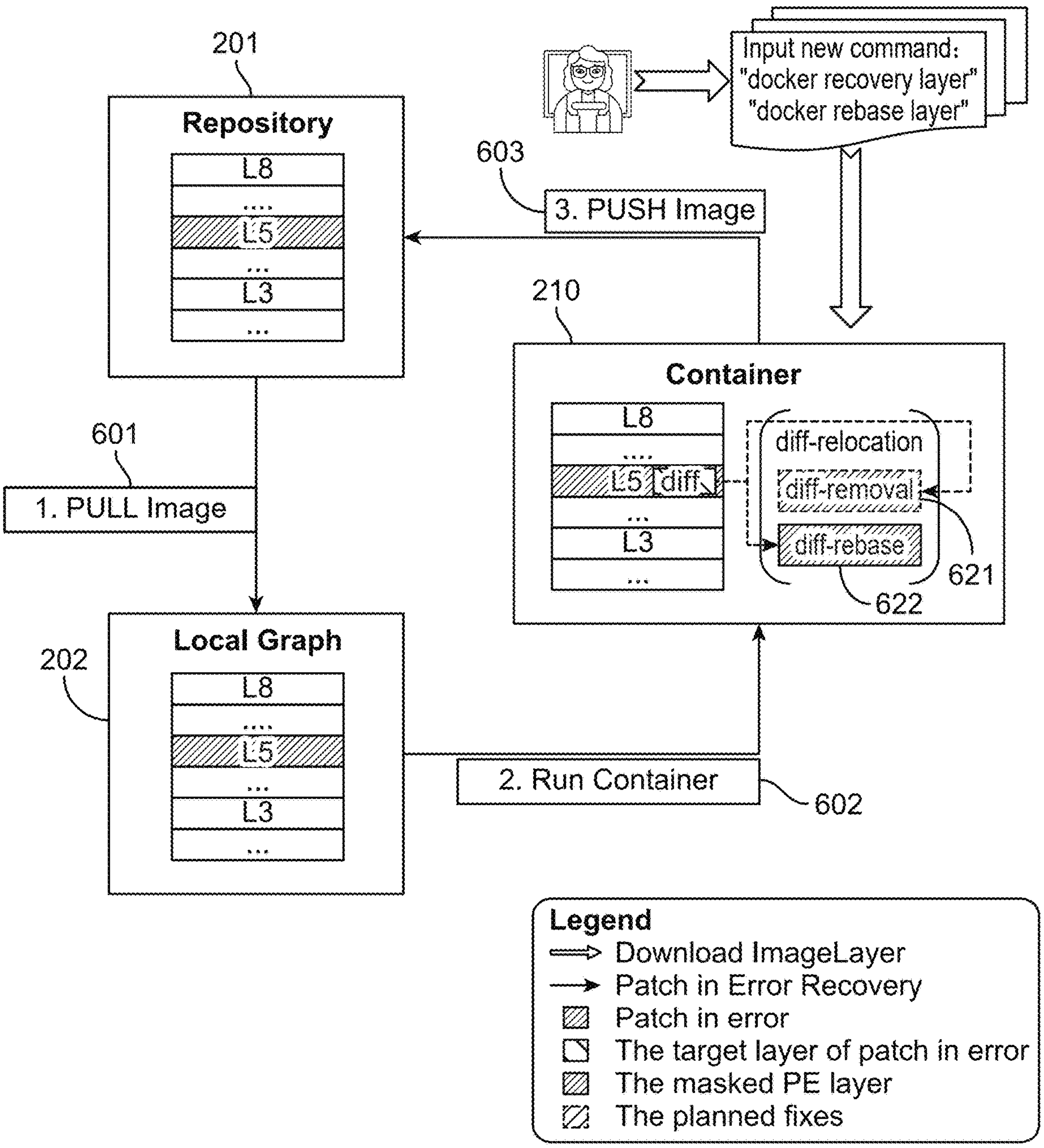
FIG. 6 illustrates a process flow for pulling, running, and pushing a container image with commands for online patch in error layer recovery and rebase, according to an embodiment.

FIG. 6 illustrates a process flow for pulling an image from a repository 201 to a local graph 202, running a container 210, and pushing a container image (e.g., the container image 200) with commands for online patch in error layer recovery and rebase, according to an embodiment. In particular, this figure shows the steps involved in downloading, running, and updating a container image, as well as the commands used to recover or rebase an image layer with a patch in error.

The process begins with step 601, where a container image (e.g., the container image 200) is pulled (e.g., downloaded) from the repository 201. The container image has multiple layers, including L3, L5 (with a patch in error), and L8. The container image is downloaded to the local graph 202, which is a structure used for managing and visualizing dependencies, relationships, and states of Docker containers and services within a local environment.

In step 602, the downloaded container image is deployed as the container 210 at the local graph 202. The container 210 includes the same layers as the downloaded image: L3, L5 (with a patch in error), and L8. The local graph 202 manages the container and its layers, allowing for efficient deployment and management of the container image.

Once the container is running, the image layer with the patch in error (L5) is identified. To address the patch in error, the diff-relocation mechanism described herein is utilized. Particularly, a new command is imputed as either a "docker recovery layer" command to initiate a recovery process or a "docker rebase layer" command to initiate a rebase process. The diff folder points to the diff-rebase 622 folder or the diff-removal 621 folder, depending on the received command. The diff-rebase 622 folder facilitates using an original (or prior) version of the layer having the patch in error that does not include the patch in error. The diff-removal 621 folder effectively masks the layer having the patch in error using an empty folder to represent the masked layer storage.

More particularly, a user can input new commands to recover or rebase the image layer with the patch in error. The commands "docker recovery layer" and "docker rebase layer" are used to invoke the OPELRC engine 152 and the OPELRB engine 154, respectively. These commands allow the system to handle the patch in error without redeploying the container image or restarting the service running the container.

In step 603, the updated container image, with the patch in error addressed (either recover or rebase), can be pushed back to the repository 201. This ensures that the repository contains the latest version of the container image, with the patch in error effectively managed.

Overall, FIG. 6 illustrates the detailed process of handling a container image with a patch in error using the diff-relocation mechanism, ensuring efficient and effective management of patches in error without disrupting the running container or redeploying the image.

Figure 7:
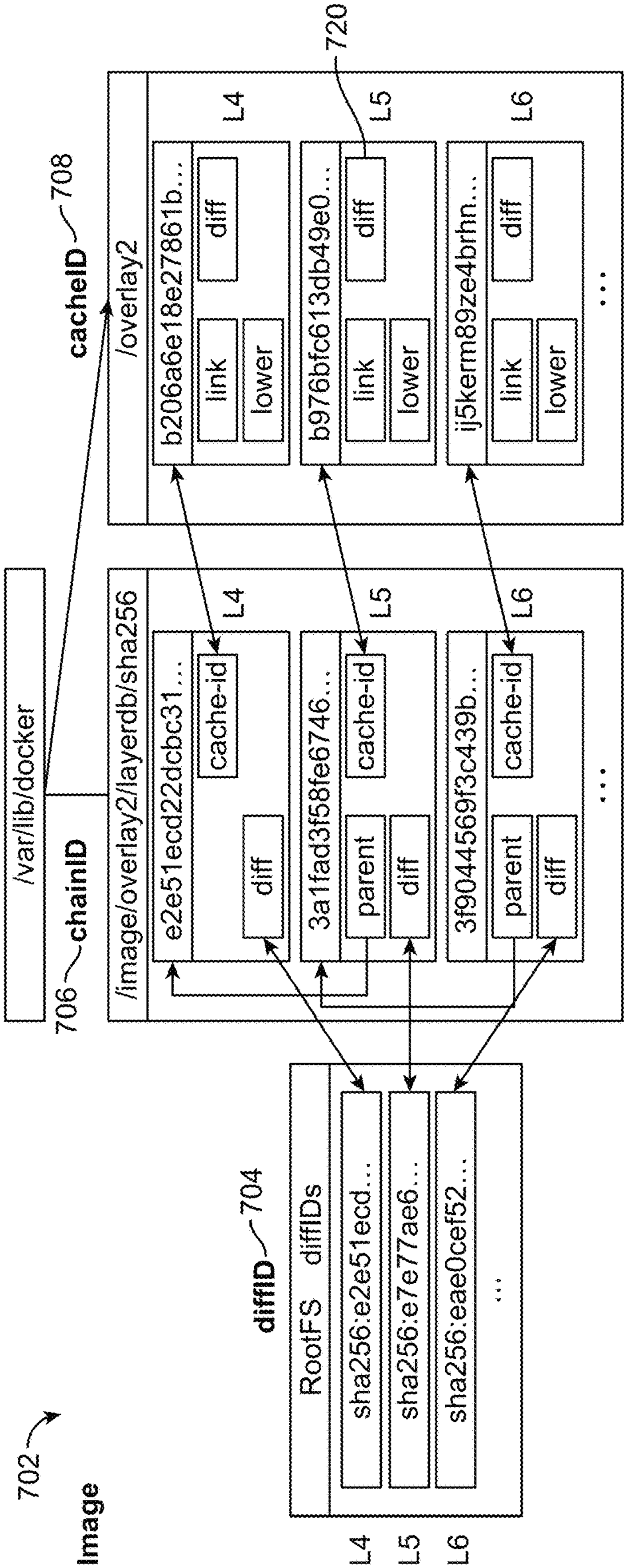
FIG. 7 illustrates the updated addressing of a patch in error layer within an image using diff-relocation, according to an embodiment.
Figure 7:
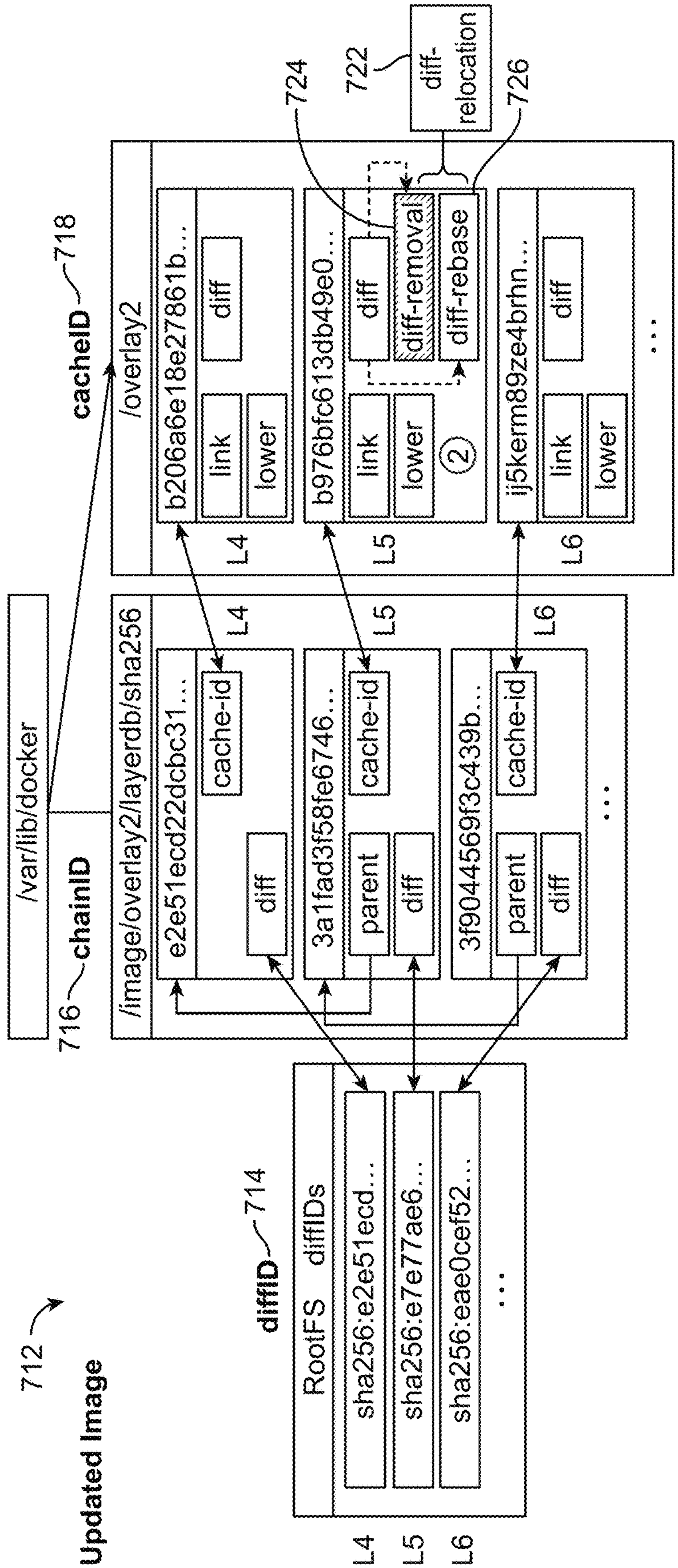

FIG. 7 illustrates the updated addressing of a patch in error layer within an image using diff-relocation, according to an embodiment. According to one or more embodiments, a new storage level "diff-relocation" is introduced to the layer cacheID 708 to make a "diff" folder (diff 720) relocated to the lower storage level, in which two new attributes "diff-removal" 724 and "diff-rebase" 726 are introduced. The "diff-removal" attribute is an empty folder and represents the masked layer storage. The "diff-rebase" attribute is the original storage of the layer with patch in error.

FIG. 7 shows the structure and flow of data from the original image 702 to the updated image 712, highlighting the changes made to handle the patch in error.

The original image 702 includes multiple layers, each identified by a diffID 704, which is unique. The layers shown in the figure are L4, L5 (with a patch in error), and L6. The diffIDs for these layers are sha256:e2e51ecd . . . , sha256:e7e77ae6 . . . and sha256:eae0cef52 . . . , respectively. These layers are stored in the /ar/lib/docker directory, with each layer having a corresponding chainID 706 and cacheID 708.

The chainID 706 represents the hierarchical structure of the layers, with each layer pointing to its parent layer. For example, the chainID for L5 points to LA as its parent, and the chainID for L6 points to L5 as its parent. The cacheID 708 represents the storage location of each layer's data within the /overlay2 directory. Each cacheID includes a diff folder (diff 720) for storing the diff-removal 724 and/or the diff-rebase 726.

In the original image 702, L5 contains the patch in error.

The updated image 712 shows the changes made to handle the patch in error in L5. The updated image includes the same layers (L4, L5, and L6) with their corresponding diffIDs 714. The diffIDs for these layers remain the same as in the original image: sha256:e2e51ecd . . . , sha256:e7e77ae6 . . . , and sha256:eae0cef52 . . . , respectively.

The chainID 716 and cacheID 718 structures are also shown for the updated image. The chainID 716 maintains the hierarchical structure of the layers, with each layer pointing to its parent layer. The cacheID 718 represents the updated storage location of each layer's data within the /overlay2 directory.

To handle the patch in error in L5, the diff-relocation mechanism is used to update the image and handle the patch in error without redeploying the container image or restarting the service running the container using diff-removal 724 to mask L5 and/or the diff-rebase 726 to restore an original version of L5.

This approach allows the system to recover or rebase the layer with the patch in error without redeploying the container image or restarting the service running the container. The diff-relocation mechanism ensures that the container continues to run smoothly, providing a seamless experience for both developers and end users.

Overall, FIG. 7 illustrates the detailed process of updating the addressing of a patch in error layer within an image using the diff-relocation mechanism, ensuring efficient and effective handling of patches in error.

Figure 8:
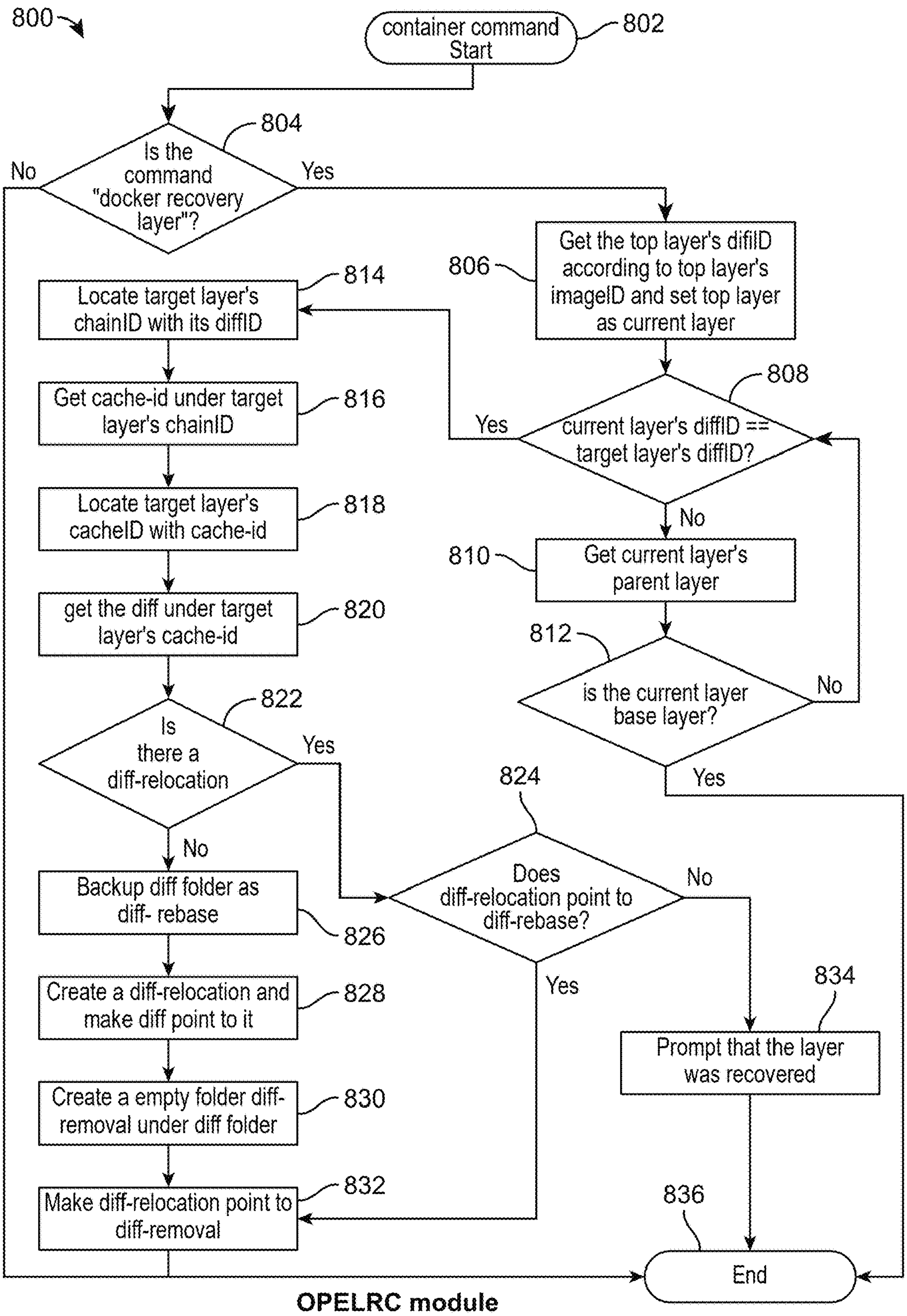
FIG. 8 illustrates a flow diagram of a method for implementing the online patch in error layer recovery engine of FIG. 1, according to an embodiment.

FIG. 8 illustrates a flow diagram of a method for implementing the OPELRC engine 152 of FIG. 1, according to an embodiment. The method 800 can be performed by any suitable computing system, device, or environment, such as those described herein (e.g., the computing environment 100 and/or the computer 101 of FIG. 1). According to one or more embodiments, the method 800 is performed, in whole or in part, using container recovery engine 150 (including one or more of the OPELRC engine 152 and/or the OPELRB engine 154) of FIG. 1.

The method 800 begins at block 802 with the initiation of a container command. At block 804, the OPELRC engine 152 checks if the command is a "docker recovery layer" command. If the command is not a "docker recovery layer" command, the method 800 ends at block 836. If the command is a "docker recovery layer" command, the method 800 proceeds to block 806.

At block 806, the OPELRC engine 152 retrieves a top layer's diffID according to the top layer's imageID and sets the top layer as the current layer. Then, the top layer's diffID is retrieved according to the top layer's image ID and the top layer is set as the current layer (e.g., target layer is L5 and the top layer is L6). The method 800 then moves to block 808.

At block 808, the OPELRC engine 152 checks if the current layer's diffID is equal to the target layer's diffID. If the diffIDs match between the current layer and the target layer, the method 800 proceeds to block 810. At block 810, the OPELRC engine 152 retrieves the current layer's parent layer. The method 800 then moves to block 812. At block 812, the OPELRC engine 152 checks if the current layer is the base layer. If the current layer is the base layer, the method 800 ends at block 836. If the current layer is not the base layer, the method 800 returns to block 808.

If, at block 808, the diffIDs do not match between the current layer and the target layer, the method 800 moves to block 814. At block 814, the OPELRC engine 152 locates the target layer's chainID using the diffID. The method 800 then moves to block 816. At block 816, the OPELRC engine 152 retrieves the cache-id under the target layer's chainID. The method 800 then moves to block 818. At block 818, the OPELRC engine 152 locates the target layer's cacheID using the cache-id. The method 800 then moves to block 820. At block 820, the OPELRC engine 152 retrieves the diff folder under the target layer's cache-id directory. The method 800 then moves to block 822.

At block 822, the OPELRC engine 152 checks if there is a diff-relocation. If there is a diff-relocation, the method 800 proceeds to block 824. At block 824, the OPELRC engine 152 checks if the diff-relocation points to diff-rebase. If the diff-relocation points to diff-rebase (block 824 "Yes"), the method 800 proceeds to block 832. If the diff-relocation does not point to diff-rebase (block 824 "No"), the method 800 moves to block 834 and then ends at block 836.

If, at block 824, there is no diff-relocation, the method 800 moves to block 826. At block 826, the OPELRC engine 152 backs up the diff folder as diff-rebase. The method 800 then moves to block 828. At block 828, the OPELRC engine 152 creates a diff-relocation and makes the diff folder point to the diff-relocation and moves the diff-rebase folder (e.g., a difference property) under diff-relocation. The method 800 then moves to block 830. At block 830, the OPELRC engine 152 creates an empty folder diff-removal under the diff folder. The method 800 then moves to block 832. At block 832, the OPELRC engine 152 makes the diff-relocation point to diff-removal. The method 800 then moves to block 834. At block 834, the OPELRC engine 152 prompts that the layer was recovered. The method 800 then moves to block 836, where the method 800 ends.

Additional processes also may be included, and it should be understood that the processes depicted in FIG. 8 represent illustrations, and that other processes may be added or existing processes may be removed, modified, or rearranged without departing from the scope of the present disclosure. It should also be understood that the processes depicted in FIG. 8 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Figure 9:
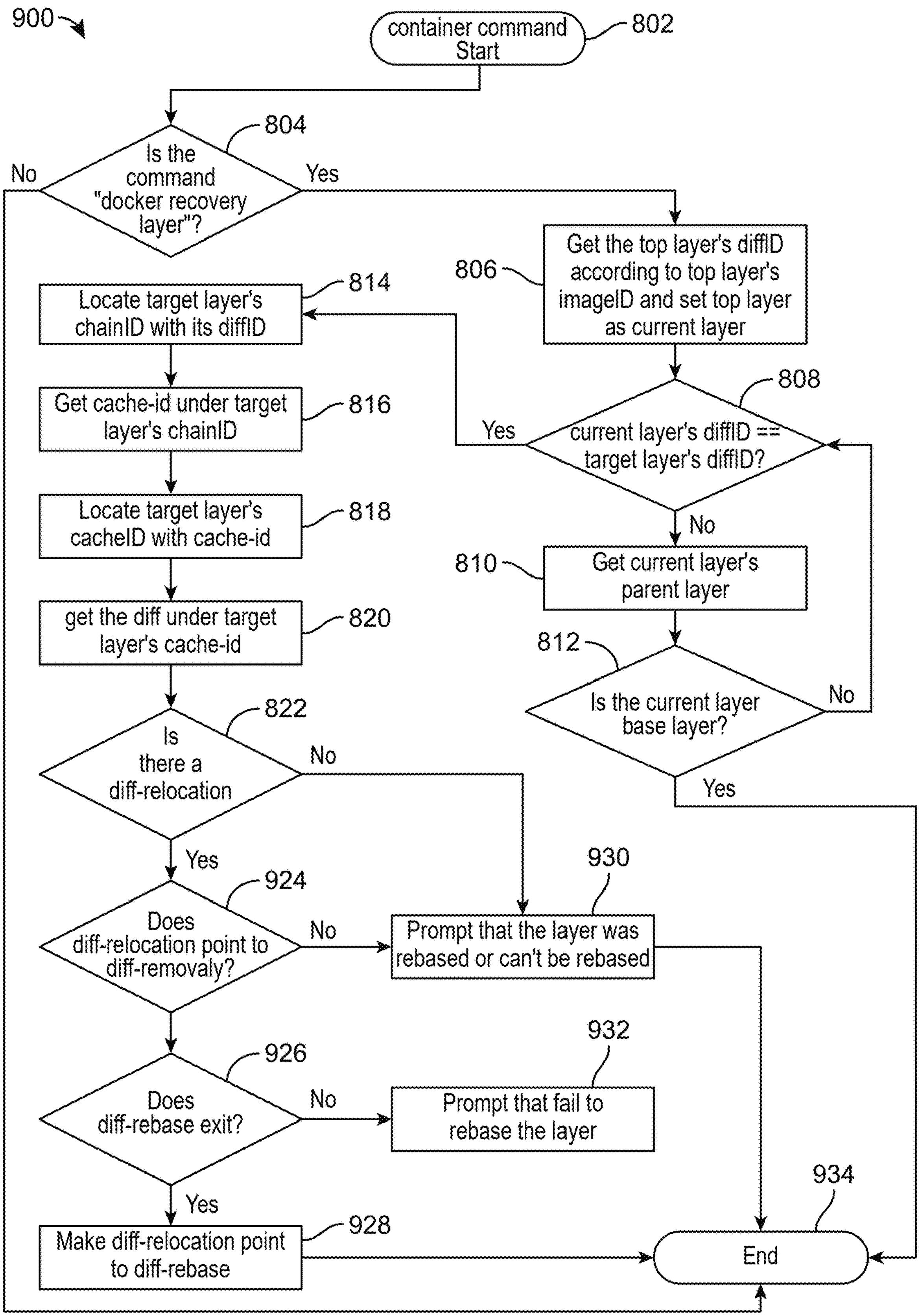
FIG. 9 illustrates a flow diagram of a method for implementing the online patch in error layer rebase engine of FIG. 1, according to an embodiment.

FIG. 9 illustrates a flow diagram of a method for implementing the OPELRB engine 154 of FIG. 1, according to an embodiment. The method 900 can be performed by any suitable computing system, device, or environment, such as those described herein (e.g., the computing environment 100 and/or the computer 101 of FIG. 1). According to one or more embodiments, the method 800 is performed, in whole or in part, using container recovery engine 150 (including one or more of the OPELRC engine 152 and/or the OPELRB engine 154) of FIG. 1.

The method 900 begins at block 802 with the initiation of a container command. At block 804, the OPELRC engine 152 checks if the command is a "docker recovery layer"

command. If the command is not a "docker recovery layer" command, the method 900 ends at block 836. If the command is a "docker recovery layer" command, the method 900 proceeds to block 806.

At block 806, the OPELRC engine 152 retrieves a top layer's diffID according to the top layer's imageID and sets the top layer as the current layer. Then, the top layer's diffID is retrieved according to the top layer's image ID and the top layer is set as the current layer (e.g., target layer is L5 and the top layer is L6). The method 900 then moves to block 808.

At block 808, the OPELRC engine 152 checks if the current layer's diffID is equal to the target layer's diffID. If the diffIDs match between the current layer and the target layer, the method 900 proceeds to block 810. At block 810, the OPELRC engine 152 retrieves the current layer's parent layer. The method 900 then moves to block 812. At block 812, the OPELRC engine 152 checks if the current layer is the base layer. If the current layer is the base layer, the method 900 ends at block 836. If the current layer is not the base layer, the method 900 returns to block 808.

If, at block 808, the diffIDs do not match between the current layer and the target layer, the method 900 moves to block 814. At block 814, the OPELRC engine 152 locates the target layer's chainID using the diffID. The method 900 then moves to block 816. At block 816, the OPELRC engine 152 retrieves the cache-id under the target layer's chainID. The method 900 then moves to block 818. At block 818, the OPELRC engine 152 locates the target layer's cacheID using the cache-id. The method 900 then moves to block 820. At block 820, the OPELRC engine 152 retrieves the diff folder under the target layer's cache-id. The method 900 then moves to block 822.

At block 822, the OPELRC engine 152 checks if there is a diff-relocation. If there is a diff-relocation, the method 900 proceeds to block 924. At block 824, the OPELRB engine 154 checks if the diff-relocation points to diff-removal. If the diff-relocation points to diff-removal, the method 900 proceeds to block 926. At block 926, the OPELRB engine 154 checks if diff-rebase exists. If diff-rebase exists, the method 900 proceeds to block 928. At block 928, the OPELRB engine 154 makes the diff-relocation (e.g., a difference property) point to diff-rebase. The method 900 then moves to block 934, where the method 900 ends. If diff-rebase does not exist (block 926 "No"), the method 900 moves to block 932. At block 932, the OPELRB engine 154 prompts that it failed to rebase the layer. The method 900 then moves to block 934, where the method 900 ends.

If the diff-relocation does not point to diff-removal (block 924 "No"), the process moves to block 930. At block 930, the OPELRB engine 154 prompts that the layer was rebased or cannot be rebased. The method 900 then moves to block 934, where the method 900 ends.

Additional processes also may be included, and it should be understood that the processes depicted in FIG. 9 represent illustrations, and that other processes may be added or existing processes may be removed, modified, or rearranged without departing from the scope of the present disclosure. It should also be understood that the processes depicted in FIG. 9 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Figure 10:
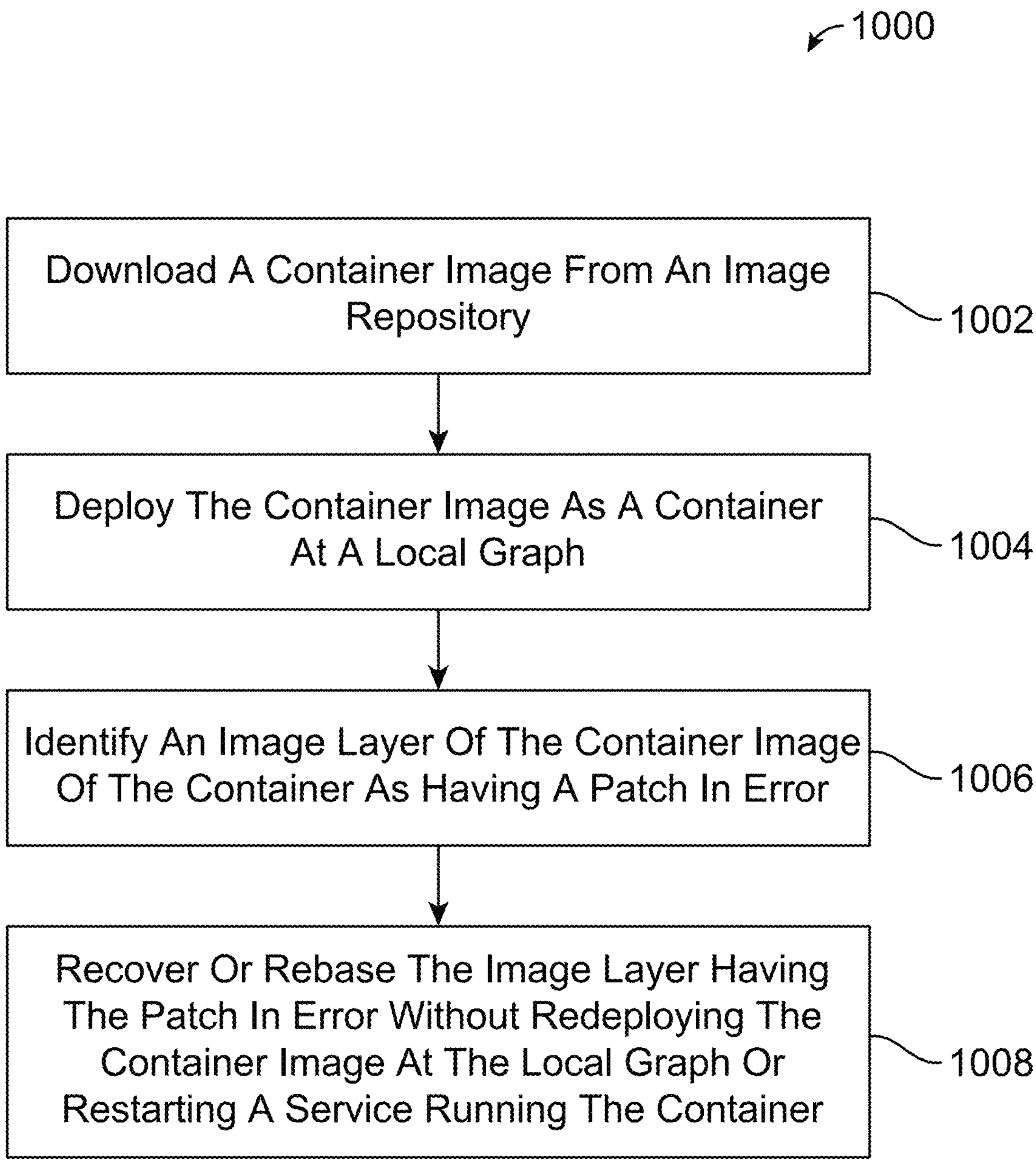
FIG. 10 illustrates a flow diagram of a method for managing container images, specifically focusing on handling image layers with patches in error, according to an embodiment.

FIG. 10 illustrates a flow diagram of a method 1000 for managing container images, specifically focusing on handling image layers with patches in error, according to an embodiment. The method 1000 can be performed by any suitable computing system, device, or environment, such as those described herein (e.g., the computing environment 100 and/or the computer 101 of FIG. 1). According to one or more embodiments, the method 800 is performed, in whole or in part, using container recovery engine 150 (including one or more of the OPELRC engine 152 and/or the OPELRB engine 154) of FIG. 1.

At block 1002, a container image (e.g., the container image 200) is downloaded from an image repository (e.g., the image repository 201). The image repository is a storage location where container images are stored and managed. These images include the components, such as code, runtime, system tools, libraries, and settings, for running a piece of software. The container image is downloaded to a local environment, referred to as a local graph (e.g., the local graph 212), where it can be deployed and managed.

At block 1004, once the container image is downloaded, it is deployed as a container (e.g., the container 210) at the local graph. The local graph is a structure used for managing and visualizing dependencies, relationships, and states of Docker containers and services within a local environment. The Docker daemon (Dockerd) manages the local graph, and the Docker command line interface (CLI) is used to interact with it. The container is an instance of the container image running as isolated processing on a host operating system (e.g., the computer 101). This step involves creating a container from the downloaded image and running it in the local environment.

At block 1006, after deploying the container, an image layer of the container image that has a patch in error is identified. A patch in error refers to a patch that was intended to fix an issue or add functionality but instead introduced new errors. The identification process involves analyzing the layers of the container image to detect any patches that are causing issues. This step is useful for ensuring that the container operates correctly and efficiently without being affected by erroneous patches.

At block 1008, once the patch in error is identified, the method 1000 proceeds to recover or rebase the image layer with the patch in error using the OPELRC engine 152 or the OPELRB engine 154, respectively. This is done without redeploying the container image at the local graph or restarting the service running the container. The recovery process involves relocating the layer cacheID's diff to a "diff-removal" folder, effectively masking the erroneous layer. The rebase process involves relocating the layer cacheID's diff to a "diff-rebase" folder, restoring the original storage of the layer with the patch in error. This approach ensures that the container continues to run smoothly without interruption, providing a seamless experience for both developers and end users. Recovering or rebasing the image layer having the patch in error without redeploying the container image at the local graph or restarting a service running the container provides a significant advantage in terms of operational continuity. This approach minimizes downtime and avoids the need for service interruptions, which is particularly beneficial in production environments where uptime is critical. The method leverages a new storage level "diff-relocation" with attributes "diff-removal" and "diff-rebase" to manage layer having the patch in error, ensuring that the container can continue to operate smoothly. As a result, the robustness and resiliency of enterprise-level production environments is improved by allowing for quick recovery or rebase of layers with patches in error.

Overall, the method 1000 provides an intelligent and automatic approach to managing container images, ensuring better use of product capabilities, automation, and resiliency insights. By recovering or rebasing layers with patches in error, the method 1000 promotes the robustness of enterprise-level production environments and minimizes security vulnerability exposure. More particularly, the method 1000 reduces the security vulnerability exposure and ensures that the containerized applications can continue to function correctly without waiting for new fixes or redeploying the entire container.

Additional processes also may be included, and it should be understood that the processes depicted in FIG. 10 represent illustrations, and that other processes may be added or existing processes may be removed, modified, or rearranged without departing from the scope of the present disclosure. It should also be understood that the processes depicted in FIG. 10 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

One or more embodiments described herein improves the functioning of a computer by enhancing the management and recovery of containerized applications, particularly in handling patches in error. The improvements can be summarized as follows.

Operational Continuity: By allowing the recovery or rebase of image layers with patches in error without redeploying the container image or restarting the service running the container, one or more embodiments ensures that applications continue to run smoothly. This minimizes downtime and avoids service interruptions, which is beneficial for maintaining high availability and reliability in production environments.

Efficient Resource Utilization: One or more embodiments leverages a new storage level "diff-relocation" with attributes "diff-removal" and "diff-rebase" to manage patches in error. This approach optimizes the use of storage resources by efficiently relocating and masking erroneous layers without duplicating data or requiring additional storage space. It also reduces the need for repeated downloads and redeployments, saving bandwidth and computational resources.

Enhanced Security: By quickly identifying and addressing patches in error, one or more embodiments reduces the exposure to security vulnerabilities. This proactive approach ensures that the containerized applications are protected from potential threats and maintain their integrity, thereby enhancing the overall security posture of the computing environment.

Improved Automation and Resiliency: The intelligent and automatic method for recovering or rebasing layers with patches in error promotes better use of product capabilities and automation. It allows for real-time updates and adjustments to the containerized applications, improving their resiliency and adaptability to changing conditions and requirements.

Transparency and Ease of Use: One or more embodiments is transparent to both developers and end users, meaning that such embodiment(s) does not require significant changes to existing workflows or additional manual interventions. The introduction of new commands ("docker recovery layer" and "docker rebase layer") simplifies the process of managing patches in error, making it easier for users to maintain and update their containerized applications.

Compatibility with Existing Tools: One or more embodiments is compatible with current container tools such as Docker, Podman, and/or the like, including combinations and/or multiples thereof. This ensures that users can integrate one or more of the embodiments described herein into existing infrastructure without the need for extensive modifications or new toolsets, thereby simplifying the implementation process.

Overall, one or more embodiments improves the functioning of a computer by providing a robust, efficient, and secure approach for managing containerized applications, particularly in handling patches in error.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method comprising:
- downloading a container image from an image repository;
- deploying the container image as a container at a local graph;
- identifying an image layer of the container image of the container as having a patch in error; and
- performing at least one of recovering and rebasing the image layer having the patch in error without redeploying the container image at the local graph or restarting a service running the container or the container,
- wherein rebasing the image layer comprises relocating a difference property for the image layer having the patch in error to a diff-rebase folder within a diff-relocation storage level, the diff-relation storage level comprising the diff-rebase folder and a diff-removal folder for managing layer versions and masking erroneous layers.

2. The computer-implemented method of claim 1, wherein recovering the image layer comprises masking the image layer having the patch in error.

3. The computer-implemented method of claim 1, wherein rebasing the image layer comprises restoring an original version of the image layer having the patch in error.

4. The computer-implemented method of claim 1, wherein recovering the image layer comprises relocating the difference property for the image layer having the patch in error to the diff-removal folder, which causes the image layer having the patch in error to be masked.

5. The computer-implemented method of claim 1, wherein the recovering is performed responsive to receiving a docker recovery layer command.

6. The computer-implemented method of claim 1, wherein the rebasing is performed responsive to receiving a docker rebase layer command.

7. A system comprising:
- a memory comprising computer readable instructions; and
- a processing device for executing the computer readable instructions, the computer readable instructions controlling the processing device to perform operations comprising:
  - downloading a container image from an image repository;
  - deploying the container image as a container at a local graph;
  - identifying an image layer of the container image of the container as having a patch in error; and
  - performing at least one of recovering and rebasing the image layer having the patch in error without redeploying the container image at the local graph or restarting a service running the container or the container, wherein rebasing the image layer comprises relocating a difference property for the image layer having the patch in error to a diff-rebase folder within a diff-relocation storage level, the diff-relation storage level comprising the diff-rebase folder and a diff-removal folder for managing layer versions and masking erroneous layers.

8. The system of claim 7, wherein recovering the image layer comprises masking the image layer having the patch in error.

9. The system of claim 7, wherein rebasing the image layer comprises restoring an original version of the image layer having the patch in error.

10. The system of claim 7, wherein recovering the image layer comprises relocating the difference property for the image layer having the patch in error to the diff-removal folder, which causes the image layer having the patch in error to be masked.

11. The system of claim 7, wherein the recovering is performed responsive to receiving a docker recovery layer command.

12. The system of claim 7, wherein the rebasing is performed responsive to receiving a docker rebase layer command.

13. A computer program product comprising:

a set of one or more computer-readable storage media;

program instructions, collectively stored in the set of one or more storage media, for causing a processor set to perform the following computer operations:

downloading a container image from an image repository;

deploying the container image as a container at a local graph;

identifying an image layer of the container image of the container as having a patch in error; and performing at least one of recovering and rebasing the image layer having the patch in error without redeploying the container image at the local graph or restarting a service running the container or the container, wherein rebasing the image layer comprises relocating a difference property for the image layer having the patch in error to a diff-rebase folder within a diff-relocation storage level, the diff-relation storage level comprising the diff-rebase folder and a diff-removal folder for managing layer versions and masking erroneous layers.

14. The computer program product of claim 13, wherein recovering the image layer comprises masking the image layer having the patch in error.

15. The computer program product of claim 13, wherein rebasing the image layer comprises restoring an original version of the image layer having the patch in error.

16. The computer program product of claim 13, wherein recovering the image layer comprises relocating the difference property for the image layer having the patch in error to the diff-removal folder, which causes the image layer having the patch in error to be masked.

17. The computer program product of claim 13, wherein the recovering is performed responsive to receiving a docker recovery layer command.

* * * * *